United States Patent
Habu et al.

(10) Patent No.: US 6,649,127 B2
(45) Date of Patent: *Nov. 18, 2003

(54) LEAD-FREE SOLDER MATERIAL HAVING GOOD WETTABILITY

(76) Inventors: Kazutaka Habu, c/o Sony Corporation, 7-35, Kitashinagawa 6-chome, Shinagawa-ku Tokyo 141 (JP); Naoko Takeda, c/o Sony Corporation, 7-35, Kitashinagawa 6-chome, Shinagawa-ku, Tokyo 141 (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/813,551

(22) Filed: Mar. 21, 2001

(65) Prior Publication Data

US 2002/0009384 A1 Jan. 24, 2002

Related U.S. Application Data

(63) Continuation-in-part of application No. 09/066,851, filed on Apr. 28, 1998.

(30) Foreign Application Priority Data

Dec. 17, 1997 (JP) .......................................... P09-348212

(51) Int. Cl.$^7$ ............................................... C22C 13/02

(52) U.S. Cl. ....................... 420/561; 420/562; 420/557; 148/400

(58) Field of Search ................................ 420/557, 560, 420/561, 562; 148/400

(56) References Cited

U.S. PATENT DOCUMENTS

| | | | | |
|---|---|---|---|---|
| 5,718,868 | A | * | 2/1998 | Ninomiya et al. .......... 420/560 |
| 6,241,942 | B1 | * | 6/2001 | Murata et al. .............. 420/561 |

FOREIGN PATENT DOCUMENTS

| | | |
|---|---|---|
| EP | 0 612 578 A1 | 8/1994 |
| EP | 0 639 426 A1 | 2/1995 |
| EP | 0 710 521 A1 | 5/1996 |
| EP | 0 847 828 A1 | 6/1998 |
| JP | 61-273296 | 12/1986 |
| JP | 62-230493 | 10/1987 |

(List continued on next page.)

OTHER PUBLICATIONS

Tetsuya Nakatsuka, et al., "Development of High Reliable Pb Free Solder", Production Engineering Research Laboratory, Hitachi, Ltd., Feb. 6–7, 1997, $3^{rd}$ Symposium on "Microjoining Assembly Technology in Electronics" p. 39.

Seiki Sakuyama, et al., "Solderabilityo f Solder–Coated Surfaces for SMT Printed Wiring Boards", Fujitsu Scientific & Technical Journal, vol. 29, No. 4, Dec. 21, 1993, pp. 357–366, XP000a439110.

Primary Examiner—Sikyin Ip (57) ABSTRACT

New and improved substantially lead-free solder compositions are provided exhibiting excellent wettability and mechanical properties. In an embodiment, an improved solder material is a substantially silver-free material including from about 0.5 to about 10% by weight of Zn, from about 0.5 to about 8% by weight of Bi, from about 0.005 to about 0.5% by weight of Ge, from about 0.3 to about 3% by weight of Cu and the balance to make 100% by weight of Sn. In another embodiment, an improved solder material includes from about 0.5 to 8% by weight of Bi, from about 0.5 to about 3% by weight of Ag, from about 0.01 to about 0.1% by weight of Ge, from about 0.3 to about 1% by weight of Cu, and the balance to make 100% by weight of Sn. In a further embodiment, an improved solder material includes from about 3 to about 15% by weight of Zn, from about 3 to about 10% by weight of In, from about 0.01 to about 0.3% by weight of Ge, from about 0.3 to about 3% by weight of Ag and the balance to make 100% by weight of Sn.

2 Claims, 9 Drawing Sheets

FOREIGN PATENT DOCUMENTS

| | | | |
|---|---|---|---|
| JP | 5-208293 | | 8/1993 |
| JP | 08-206874 | | 8/1996 |
| JP | 08206874 | * | 8/1996 |
| JP | 09-155587 | | 6/1997 |
| JP | 09-174278 | | 7/1997 |
| JP | 09-206983 | | 8/1997 |
| JP | 10-006075 | | 1/1998 |
| WO | WO92/17617 | | 10/1992 |
| WO | WO97/12719 | | 4/1997 |

* cited by examiner

LEAD-FREE SOLDER MATERIAL HAVING GOOD WETTABILITY

RELATED APPLICATION DATA

This application is a continuation-in-part of copending application Ser. No. 09/066,851, filed Apr. 28, 1998. The present and foregoing applications claim priority to Japanese Application No. P08-336978, filed Dec. 17, 1996, and to Japanese Application No. P09-348212, filed Dec. 17, 1997. All of the foregoing applications are incorporated herein by reference to the extent permitted by law.

BACKGROUND OF THE INVENTION

1. Field of the Invention

This invention relates to a solder material used for connecting electronic components mounted on a wiring substrate.

2. Related Art

As a solder material used for connecting electronic components mounted on an wiring substrate, a tin-lead based eutectic solder is predominantly used.

Recently, the problem of environmental pollution by lead has been pointed out mainly in Europe and the United States and the possibility of placing a ban is being discussed. For coping with this tendency, research for reducing the consumption of lead in the solder material or development of a lead-free solder material have been desired.

The tin-lead solder, predominantly used nowadays, has an eutectic structure of 63 wt % of tin and 37 wt % of lead, with the eutectic temperature being 183° C. This tin-lead solder has its wettability optimized by the proportion of lead and superior wettability can be realized at lower temperatures to give optimum soldering properties.

On the other hand, the lead-free solder material, now investigated, is based on tin and is of a composition composed of plural elements for realizing properties comparable with the tin-lead solder. Specifically, various additive elements are added to the binary eutectic alloy of the Sn—Ag, Sn—Zn, Sn—In and Sn—Bi system for controlling the properties.

However, these lead-free solder materials are inferior to the tin-lead solder in temperature characteristics, such as melting temperature, or in wettability, such that a further improvement has been desired.

In particular, acceptability of soldering depends on the wettability of the solder material. That is, if the solder material is less susceptible to wetting, it is in poor contact with the component to be connected. Conversely, if it is wetted excessively, solder bridging is induced between components which should not be connected to each other, thus producing shorting. The higher the mounting density of the wiring substrate, the more acute is the problem ascribable to wettability, such that it is not too much to say that the quality of electronic components in the surface mounting technique depends primarily on the wettability of the solder.

In light of the above, the lead-free solder material, thus far proposed, encounters difficulties in controlling its wettability, because lead is not used, such that optimum soldering properties are not realized.

SUMMARY OF THE INVENTION

It is therefore an object of the present invention to provide a lead-free solder material which is superior in wettability to realize an excellent soldering performance.

In addition, in one aspect, the present lead-free solder also does not include a Sb material and therefore further limits environmental pollution to the Earth.

In one aspect, the present invention provides a solder material wherein a Sn—Zn—Bi alloy containing 0.5 to 10 wt % of zinc and 0.5 to 8 wt % of bismuth, with the balance being substantially tin, is further alloyed with 0.005 to 0.5 wt % of germanium and 0.3 to 3 wt % of copper.

It is possible for the solder material to contain 0.3 to 1 wt % of copper.

In another aspect, the present invention provides a solder material wherein a Sn—Bi—Ag alloy containing 0.5 to 8 wt % of bismuth and 0.5 to 3 wt % of silver, with the balance being substantially tin, is further alloyed with 0.01 to 0.1 wt % of germanium.

In yet another aspect, the present invention provides a solder material wherein a Sn—Zn—In alloy containing 3 to 15 wt % of zinc and 3 to 10 wt % of indium, with the balance being substantially tin, is further alloyed with 0.01 to 0.3 wt % of germanium and 0.3 to 3 wt % of silver.

Since the solder material of the present invention is a Sn—Zn—Bi alloy added to with germanium and copper, a Sn—Bi—Ag alloy added to with germanium, a Sn—Bi—Ag alloy added to with germanium and copper or a Sn—Zn—In alloy added to with germanium and silver, the solder material exhibits superior mechanical properties and satisfactory wettability while having an optimum melting temperature as a solder. Thus, it is possible with the lead-free solder material to realize excellent soldering characteristics comparable with the tin-lead solder.

These and other features of the present invention will become clearer with reference to the following detailed description of the presently preferred embodiments and accompanying drawings.

DESCRIPTION OF PREFERRED EMBODIMENTS

The present invention will now be explained in detail.

The solder material of the present invention is a lead-free and, in an embodiment, antimony-free solder material containing Sn as a basic element, and is (1) a solder material comprised of a Sn—Zn—Bi alloy of tin, zinc and bismuth containing germanium and copper as additives, (2) a solder material comprised of a Sn—Bi—Ag alloy of tin, bismuth and silver containing germanium as an additive or a solder material comprised of a Sn—Bi—Ag alloy containing germanium and copper as additives, and (3) a solder material comprised of a Sn—Zn—In alloy of tin, zinc and indium containing germanium and silver as additives and (3) a Sn—Zn In alloy of tin, zinc and indium containing germanium and silver as additives.

In these solder materials, Ge, Cu and Ag, as additives, are used for improving wettability of the solder materials.

However, for improving the wettability of the solder materials for realizing optimum soldering performance, it is necessary for the constituent elements of the solder material, added to with the additives, to be in an optimum composition. This optimum composition is explained for each of the respective solder materials. It is noted that the composition (wt %) of the solder materials has been measured on the melted sample of the solder in accordance with ICP-AES analysis (Inductively Coupled Plasma Atomic Emission Spectrometer).

(1) In the solder material comprised of a Sn—Zn—Bi alloy added to with Ge and Cu, the respective constituent elements should be contained in the following proportions:
Zn: 0.5 to 10 wt %
Bi: 0.5 to 8 wt %
Ge: 0.005 to 0.5 wt %
Cu: 0.3 to 3 wt %
Sn: balance,
where each of the Zn, Bi, Ge and Cu materials has an obviously minimum weight % in the solder alloy, and the base material such as Sn has a maximum value of 98.695 weight %, and when these each of the Zn, Bi, Ge and Cu materials has a maximum weight % in the solder alloy, this base metal Sn has a minimum value such as 78.5 weight % accordingly.

Of these, Zn and Bi operate for lowering the melting temperature of the solder material. If the proportions of Zn and Bi are lower than the above ranges, the melting temperature of the solder material becomes higher than that of the tin-lead solder, such that the current soldering process cannot be used. If the proportions of Zn and Bi exceed the above ranges, the solder material becomes brittle, thus possibly causing line breakages. If the proportions of Zn and Bi are increased, fluidity tends to be lower. More preferably, the proportion of Zn is 0.5 to 5 wt %, while that of Bi is 0.5 to 3 wt %.

Ge and Cu are added for improving the wettability of the solder material. If the proportions of Ge and Cu are outside the above range, the wettability are lowered, such that an optimum soldering performance cannot be achieved. In particular, Cu operates to assist capturing Ge into the soldering alloy, such that, in the absence of the co-existing Cu, it is difficult to get a sufficient amount of Ge contained in the solder. Therefore, Cu needs be added for demonstrating the effect of Cu.

However, if the proportion of Cu exceeds the above range, a Cu—Sn intermetallic compound is formed, as a result of which cracks are produced. If the content of Cu is excessive, the solder is increased in the melting temperature as compared to the tin-lead solder, thus giving rise to inconveniences that the heating temperature for connection needs to be set to a higher temperature.

(2) In the solder material comprised of a Sn—Bi—Ag alloy added to with Ge and Cu, the respective constituent elements should be contained in the following proportions:
Bi: 0.5 to 8 wt %
Ag: 0.5 to 3 wt %
Ge: 0.01 to 0.1 wt %
Cu: 0.3 to 3 wt %
Sn: balance,
where each of the Bi, Ag, Ge and Cu materials has an obviously minimum weight % in the solder alloy, the base material such as Sn has a maximum value of 98.99 weight %, and when these each of the Bi, Ag, Ge and Cu materials has a maximum weight % in the solder alloy, this base metal Sn has a minimum value such as 88.9 weight % accordingly.

Of these, Bi operates for lowering the melting temperature of the solder material. If the proportion of Bi is lower than the above range, the melting temperature of the solder material becomes higher than that of the tin-lead solder, thus giving rise to an inconvenience that the heating temperature used for connection needs to be set to a higher temperature. If the proportion of Bi is smaller than 0.5 wt %, the wettability of the solder material is also impaired. If the proportion of Bi exceeds the above range, the solder material becomes brittle, thus possibly causing line breakages.

Ag is used for controlling the wettability of the solder material. If the proportion of Ag is within the above range, the contact angle θ in the wetting test is decreased, thus assuring optimum wettability. If the proportion of Ag is outside the above range, the wettability is impaired. If the amount of Ag is excessive, the melting temperature of the solder material is prohibitively increased, while needle-like crystals are precipitated to deteriorate mechanical properties of the solder.

Ge is added for improving the wettability of the solder material. If the proportion of Ge is outside the above range, the wettability is deteriorated, such that optimum soldering properties cannot be achieved. Ge also operates for suppressing generation of an oxide termed dross.

In this Sn—Bi—Ag alloy, Cu can also be added along with Ge in the proportion of 0.3 to 1 wt %.

Cu operates not only for improving the wettability of the solder material but also for assisting in capturing Ge into the solder material. It is therefore meritorious to add Cu for controlling the proportion of Ge. If the proportion of Cu exceeds the above range, a Cu—Sn intermetallic compound is formed to generate cracks. If the amount of Cu is excessive, the melting temperature is higher than that of the tin-lead solder to raise the melting temperature or to impair the wettability.

(3) In the solder material comprised of a Sn—Zn—In alloy added to with germanium and silver, the respective constituent elements should be contained in the following proportions:

Zn: 3 to 15 wt %
In: 3 to 10 wt %
Ge: 0.01 to 0.3 wt %
Ag: 0.3 to 3 wt %
Sn: balance, where each of the Zn, In, Ge and Ag materials has obviously a minimum weight % in the solder alloy, the base material such as Sn has a maximum value of 93.69 weight %, and when these Zn, In, Ge and Ag materials has a maximum weight % in the solder alloy, this base metal Sn has a minimum value such as 71.7 weight % accordingly.

Of these, Zn operates for lowering the melting temperature of the solder material. If the proportion of Zn is lower than the above range, the solder is higher in melting temperature than the tin-lead solder thus giving rise to an inconvenience that the heating temperature for connection undesirably needs to be set to a higher temperature.

The more desirable proportion of Zn is 6 to 10 wt %.

It operates not only for improving the wettability but also lowers the melting temperature of the solder material. If the proportion of In is lower than the above range, the wettability is impaired, while the melting temperature is excessive to render it impossible to realize optimum wettability. If the proportion of In is larger than the above range, the mechanical strength tends to be lowered.

Both Ge and Ag operate for improving the wettability of the solder material. If the proportions of Ge and Ag are lower than the above range, sufficient wettability cannot be achieved, while optimum soldering properties cannot be realized. If the proportion of Ag is larger than the above range, the wettability is impaired, while the melting temperature of the solder material is prohibitively increased. It is noted that the upper limit of the proportion of Ge corresponds to the maximum amount of Ge that can be melted into the alloy and is thereby determined spontaneously.

The above is the definition of the composition of the solder material according to the present invention. The expression "Sn being the balance" means that the balance is mainly composed of Sn without excluding inevitably contained impurities.

For obtaining the above-mentioned solder material, particles or ingots of tin as base metal and particles or ingots of other elements are charged into a crucible and melted so as to be then cooled to solidify to an alloy.

As for the charging amounts of the respective elements, since the mixing ratios of Sn, Zn, Bi, Ag and In are substantially reflected in the proportions of the alloy, it suffices to use the amounts corresponding to the desired proportions of the alloy as the charging amounts.

As for Cu and Ge, if these elements are used as ingots, part of the charged amount is not alloyed, but is left in the a crucible as sole elements. In the case of Cu, for example, the amount thereof taken into the alloy is on the order of 70% of the charging amount. The amount of Ge taken into the alloy is smaller and is on the order of 1% and 10% with the Sn—Zn—Bi alloy and with the Sn—Bi—Ag or Sn—Zn—In alloy, respectively. Therefore, with Cu and Ge, this loss needs to be taken into account when setting the charging amount. Meanwhile, the penetration of Ge into the alloy is accelerated by Cu, such that, if Ge and Cu are used in conjunction, the amount of penetration of Ge into the alloy is on the order of several times that in case of addition only of Ge.

EXAMPLES

The present invention will be explained with reference to specified Examples based on the experimental results.

In Examples 1-1 to Comparative Examples 1-5, in Examples 2-1 to Comparative Examples 2-2 and in Examples 3-1 to Comparative Examples 3-6, investigations were made of addition elements to the Sn—Zn—Bi alloy, Sn—Bi—Ag alloy and to the Sn—Zn—In alloy, respectively.

Example 1-1

Particulate ingots of tin, zinc, bismuth, germanium and copper were weighed out in charging amounts shown in table 1 and charged in a mixture into a magnetic crucible having a capacity of 5 cc. The particulate ingots were all of a purity of 99.99% or higher. These ingots were melted at a temperature approximately 400° C. and kept in the melted state for two to three hours and allowed to cool to solder ingots (Sn—Zn—Bi solder samples added to with Ge and Cu). Table 2 shows the composition of the solder sample as measured by ICP-AES analysis.

Comparative Example 1-1

Particulate ingots of tin, zinc and bismuth were charged I into a crucible in charging amounts shown in Table 1 and melted and cooled in the same way as in Example 1-1 to prepare solder ingots (Sn—Zn—Bi solder sample devoid of additions). Table 2 shows the composition of the solder sample by ICP-AES analysis.

Comparative Example 1-2

Particulate ingots of tin, zinc, bismuth and germanium were charged into a crucible in charging amounts shown in Table 1 and melted and cooled in the same way as in Example 1-1 to prepare solder ingots (Sn—Zn—Bi solder sample added to with Ge). Table 2 shows the composition of the solder sample by ICP-AES analysis.

Comparative Example 1-3

Particulate ingots of tin, zinc, bismuth and silver were charged into a crucible in charging amounts shown in Table 1 and melted and cooled in the same way as in Example 1-1 to prepare solder ingots (Sn—Zn—Bi solder sample added to with Ag). Table 2 shows the composition of the solder sample by ICP-AES analysis.

Comparative Example 1-4

Particulate ingots of tin, zinc, bismuth, germanium and silver were charged into a crucible in charging amounts shown in Table 1 and melted and cooled in the same way as in Example 1-1 to prepare solder ingots (Sn—Zn—Bi solder sample added to with Ge and Ag). Table 2 shows the composition of the solder sample as measured by ICP-AES analysis.

Comparative Example 1-5

Particulate ingots of tin, zinc, bismuth, germanium, silver and copper were charged into a crucible in charging amounts shown in Table 1 and melted and cooled in the same way as in Example 1-1 to prepare solder ingots (Sn—Zn—Bi solder sample added to with Ge, Cu and Ag). Table 2 shows the composition of the solder sample by ICP-AES analysis.

TABLE 1

|  | Sn (wt %) | Zn (wt %) | Bi (wt %) | Ge (wt %) | Ag (wt %) | Cu (wt %) |
|---|---|---|---|---|---|---|
| Ex. 1-1 | 88.3 | 8.7 | 2.0 | 0.5 | 0.0 | 0.5 |
| Comp. Ex. 1-1 | 89.8 | 8.7 | 2.0 | 0.0 | 0.0 | 0.0 |
| Comp. Ex. 1-2 | 88.8 | 8.7 | 2.0 | 0.5 | 0.0 | 0.0 |
| Comp. Ex. 1-3 | 88.8 | 8.7 | 2.0 | 0.0 | 0.5 | 0.0 |
| Comp. Ex. 1-4 | 88.3 | 8.7 | 2.0 | 0.5 | 0.5 | 0.0 |
| Comp. Ex. 1-5 | 87.8 | 8.7 | 2.0 | 0.5 | 0.5 | 0.5 |

TABLE 2

|  | Sn (wt %) | Zn (wt %) | Bi (wt %) | Ge (wt %) | Ag (wt %) | Cu (wt %) |
|---|---|---|---|---|---|---|
| Ex. 1-1 | balance | 9.2 | 2.0 | 0.03 | 0 | 0.37 |
| Comp. Ex. 1-1 | balance | 9.0 | 2.0 | 0 | 0 | 0 |
| Comp. Ex. 1-2 | balance | 9.3 | 1.9 | 0.006 | 0 | 0 |
| Comp. Ex. 1-3 | balance | 9.2 | 2.0 | 0 | 0.5 | 0 |
| Comp. Ex. 1-4 | balance | 9.6 | 2.0 | 0.08 | 0.6 | 0 |
| Comp. Ex. 1-5 | balance | 9.3 | 2.0 | 0.03 | 0.5 | 0.36 |

Of the solder samples, wettability was evaluated using the wetting balance method.

The wetting balance method is a method consisting in evaluating the wettability of the solder by dipping a parent metal (mating connecting material) in a solder solution and observing time changes (transient phenomenon) of the wetting power F.

Figure 1:
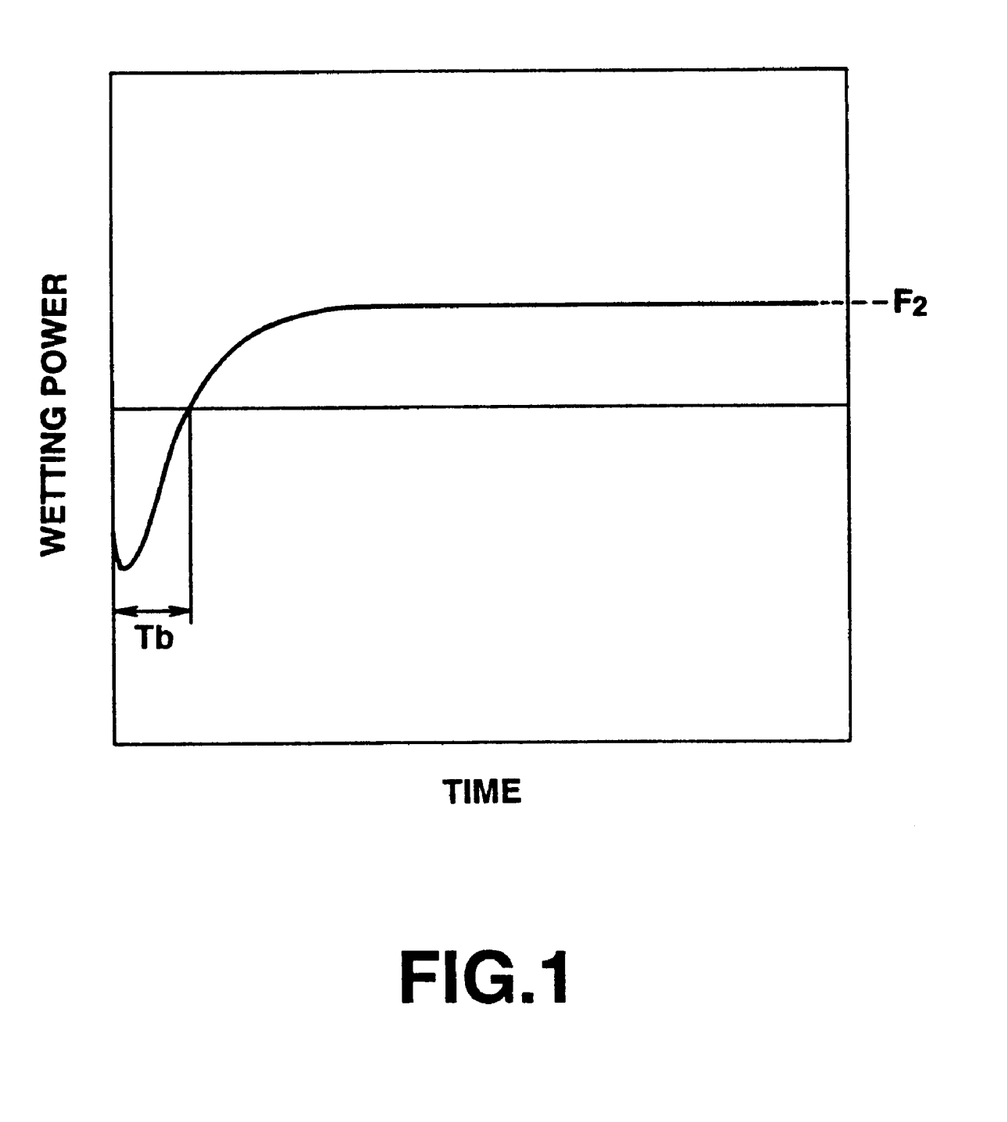
FIG. 1 is a graph showing a typical instance showing the relation between the wetting power and time as measured by the wetting balance method.

The wetting force F is found by the following equation:

$$F = \gamma \cdot L \cdot \cos\theta - g \cdot \rho \cdot V$$

where
F=wetting power
γ=surface tension
L=circumferential length the parent metal occupies in the melted solder solution
θ=contact angle between the parent metal and the melted solder solution
ρ=density of the melted solder solution
V=volume occupied by the parent metal in the melted solder solution
g=acceleration of the force of gravity By dipping the parent metal in the melted solder solution at a pre-set velocity and observing time changes of the wetting power F since the time of coming into contact of the parent metal with the melted solution, a curve shown in FIG. 1 is obtained.

The solder wettability can be evaluated from this curve. Specifically, the time Tb since coming into contact of the parent metal with the melted solution until the wetting power becomes positive (zero-crossing time), uprising of the wetting power after it has become positive and the value of the wetting power F2 after the solder has been wet and the wetting power has acquired a steady-state value stand for the indices for the wettability, such that, the shorter the zero crossing time Tb, the steeper the uprising of the wetting power and the larger the wetting power F2 after becoming steady, the faster is the rate of spreading of the solder and hence the more satisfactory is the wettability.

Figure 2:
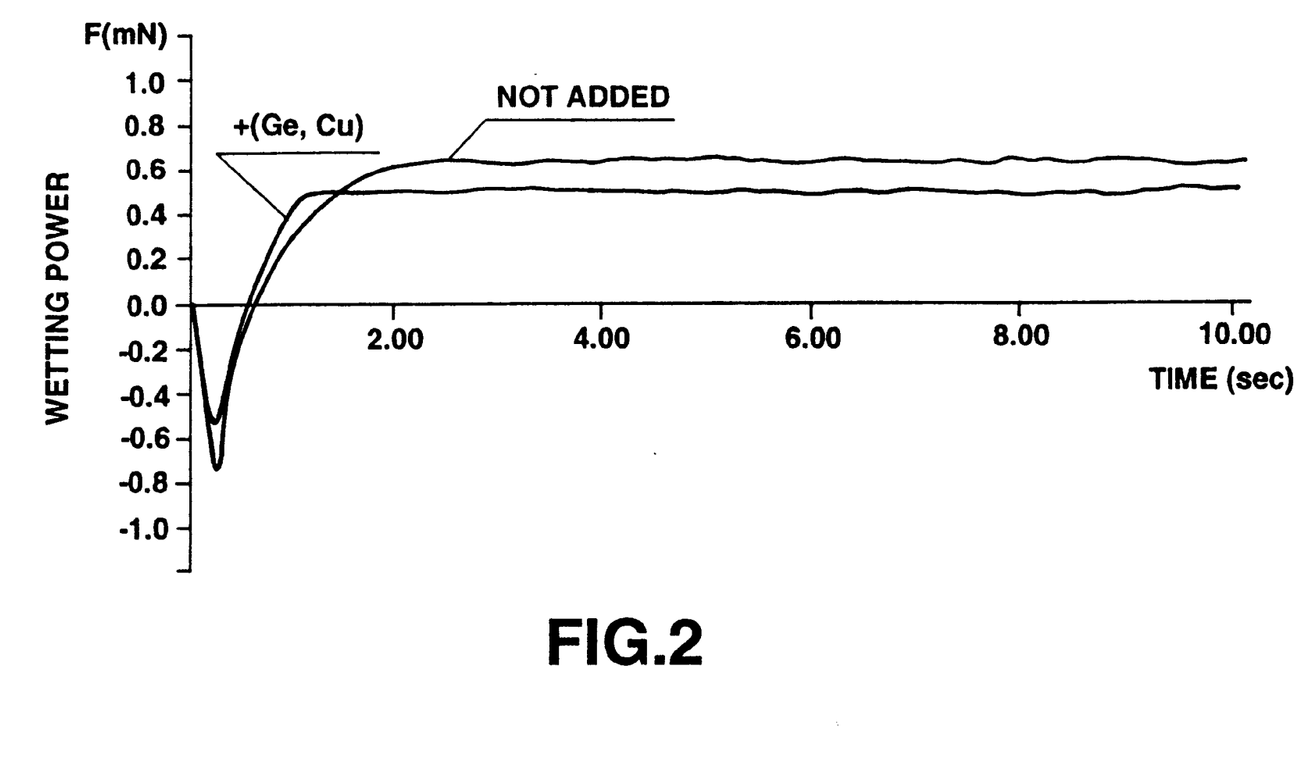
FIG. 2 is a graph showing wettability of a solder material comprised of a Sn—Zn—Bi alloy added to with copper and the same alloy not added to with copper.
Figure 3:
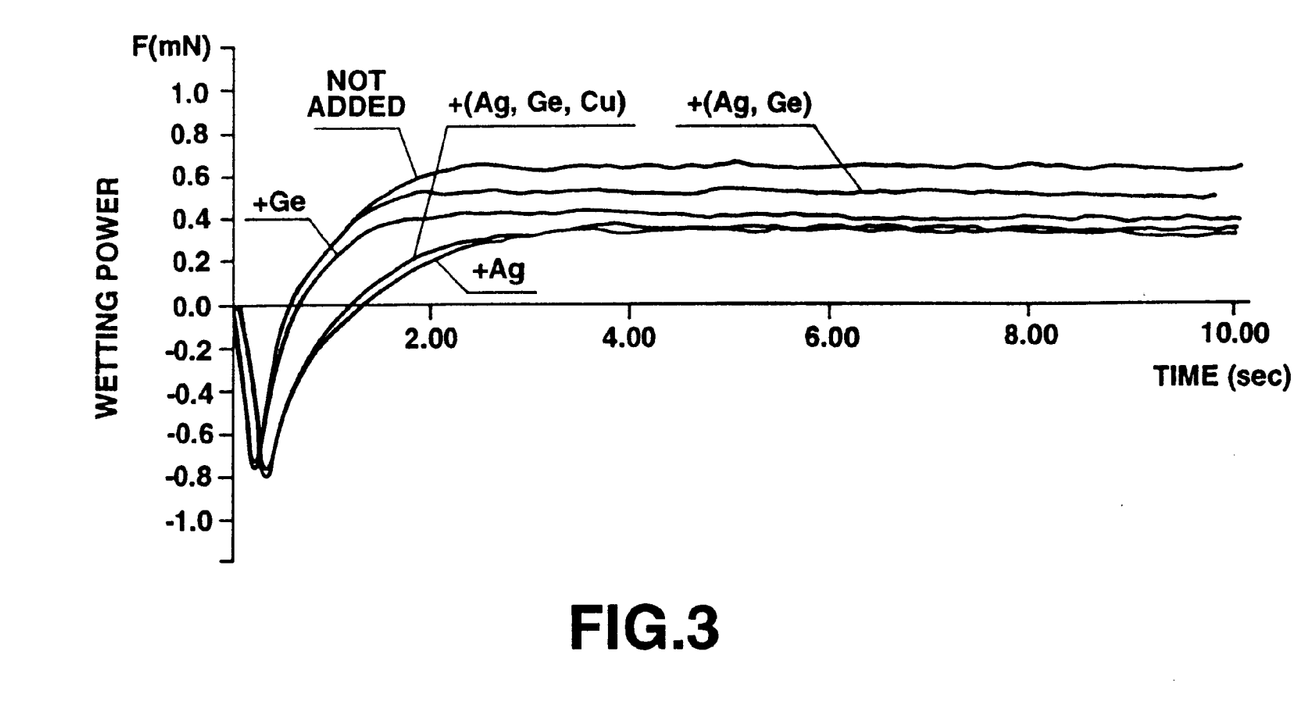
FIG. 3 is a graph showing wettability of a solder material comprised of a Sn—Zn—Bi alloy added to with germanium alone, a solder material comprised of a Sn—Zn—Bi alloy added to with silver alone, a solder material comprised of a Sn—Zn—Bi alloy added to with germanium and silver, a solder material comprised of a Sn—Zn—Bi alloy added to with germanium, copper and silver and a solder material comprised of a Sn—Zn—Bi alloy devoid of additives.

These time changes of the wetting power were observed with the solder samples fabricated in the Example 1-1 and the Comparative Examples 1-1 to 1-5. The results are shown in FIGS. 2 and 3. Meanwhile, FIG. 2 shows wetting characteristics of the Example 1-1 and Comparative Example 1-1 and FIG. 3 shows those of the Comparative Examples 1-1 to 1-5. The measurement conditions were as follows:

parent metal (mating connecting material): copper wire with an outer diameter of 0.6 mm (the copper wire is surface treated with a pure rosin based flux);
surface temperature of the melted solder solution: approximately 240° (238±3° C.);
feed rate of copper wire to a solder vessel: 10 mm/sec
dipping depth of the copper wire in the solder vessel: 10 sec It is seen from FIG. 2 that the solder sample added to with Ge and Cu is short in the zero-crossing time Tb and is moreover steep in the uprising of the wetting power, thus exhibiting comprehensively superior wettability, although it is slightly inferior in the wetting power F2 to the solder samples not added to with Ge and Cu.

It is seen from this that addition of Ge and Cu to the Sn—Zn—Bi based solder sample is effective in improving the wettability.

FIG. 3 shows wetting characteristics of a solder sample containing no additives, a solder sample containing only Ge, a solder sample containing only Ag, a solder sample containing Ag and Ge and a solder sample containing Ag, Ge and Cu.

Of these, the solder sample containing only Ag and the solder sample containing Ag, Ge and Cu are significantly inferior in wettability. The solder sample containing Ag and Ge is comparable with the solder sample containing no additive in the zero-crossing time Tb and the uprising of the wetting power and is lower in the wetting power F2 to the solder material not containing additives. The solder sample containing only Ge is inferior to the solder sample not containing additives in any of the zero-crossing time Tb, uprising of the wetting power and the wetting power F2.

Thus, addition of Ge and Cu to the Sn—Zn—Bi based solder sample impairs the wettability of the solder, signifying that the wettability improving effect is proper to the addition of two elements Ge and Cu.

Tables 1 and 2 show the charging ratios of the respective elements and the composition after alloying for the Example 1-1 and the Comparative Examples 1-1 to 1-5. In the case of Ge, it differs significantly between the charging ratio and the composition after alloying, meaning that Ge can only difficultly be taken into the alloy. If the Comparative Example 1-2 added to only with Ge and the Example 1-1 added to with two elements of Ge and Cu, the Ge proportion after alloying is higher in Example 1-1 although the charging ratio of Ge is the same. This indicates that Cu operates for assisting in taking Ge into the alloy.

Example 2-1

Particulate ingots of tin, bismuth, silver and germanium were charged into a crucible in charging amounts shown in Table 3 and melted and cooled in the same way as in Example 1-1 to prepare solder ingots (Sn—Bi—Ag solder sample added to with Ge). Table 4 shows the composition of the solder sample by ICP-AES analysis.

Example 2-2

Particulate ingots of tin, bismuth, silver and germanium were charged into a crucible in charging amounts shown in Table 3 and melted and cooled in the same way as in Example 1-1 to prepare solder ingots (Sn—Bi—Ag solder sample added to with Ge and Cu). Table 4 shows the composition of the solder sample by ICP-AES analysis.

Comparative Example 2-1

Particulate ingots of tin, bismuth and silver were charged into a crucible in charging amounts shown in Table 3 and melted and cooled in the same way as in Example 1-1 to prepare solder ingots (Sn—Bi—Ag solder sample containing no additives). Table 4 shows the composition of the solder sample by ICP-AES analysis.

Comparative Example 2-2

Particulate ingots of tin, bismuth, silver and copper were charged into a crucible in charging amounts shown in Table 3 and melted and cooled in the same way as in Example 1-1 to prepare solder ingots (Sn—Bi—Ag solder sample added to with Cu). Table 4 shows the composition of the solder sample by ICP-AES analysis.

TABLE 3

|  | Sn (wt %) | Bi (wt %) | Ag (wt %) | Ge (wt %) | Cu (wt %) |
| --- | --- | --- | --- | --- | --- |
| Ex. 2-1 | 93.5 | 4.0 | 2.0 | 0.5 | 0.0 |
| Ex. 2-2 | 93.0 | 4.0 | 2.0 | 0.5 | 0.5 |
| Comp. Ex. 2-1 | 94.0 | 4.0 | 2.0 | 0.0 | 0.0 |
| Comp. Ex. 2-2 | 93.5 | 4.0 | 2.0 | 0.0 | 0.5 |

TABLE 4

|  | Sn (wt %) | Bi (wt %) | Ag (wt %) | Ge (wt %) | Cu (wt %) |
| --- | --- | --- | --- | --- | --- |
| Ex. 2-1 | balance | 4.1 | 2.1 | 0.04 | 0 |
| Ex. 2-2 | balance | 4.1 | 2.0 | 0.07 | 0.51 |
| Comp. Ex. 2-1 | balance | 4.0 | 2.0 | 0 | 0 |
| Comp. Ex. 2-2 | balance | 4.0 | 2.0 | 0 | 0.5 |

For the solder samples, fabricated as described above, evaluation was made of wettability by the wetting balance method as described above. The results are shown in FIG. 4.

Figure 4:
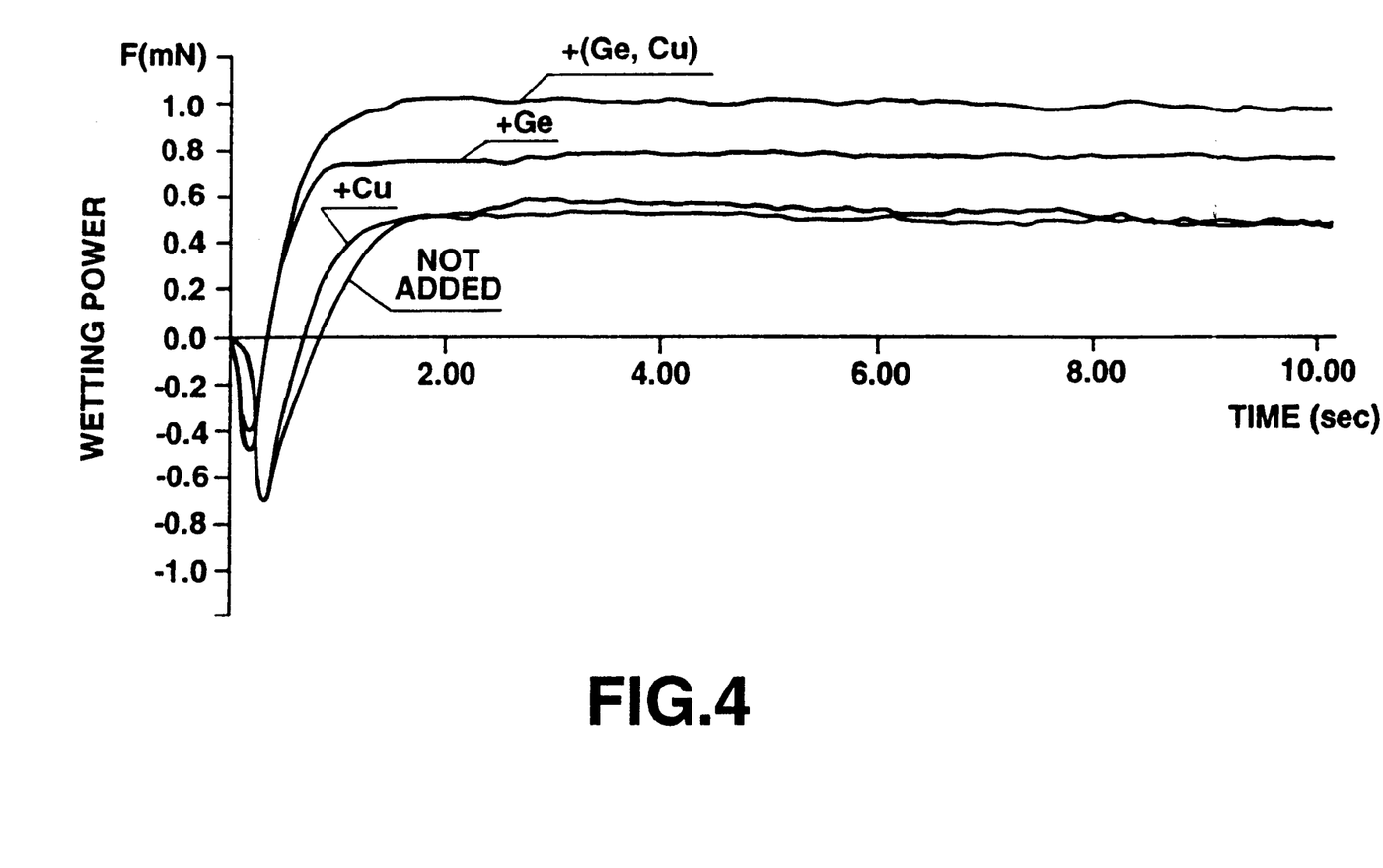
FIG. 4 is a graph showing wettability of a solder material comprised of a Sn—Bi—Ag alloy added to with germanium alone, a solder material comprised of a Sn—Bi—Ag alloy added to with germanium and copper, a solder material comprised of a Sn—Bi—Ag alloy added to with copper alone and a solder material comprised of a Sn—Bi—Ag alloy devoid of additives.

It is seen from FIG. 4 that the solder sample comprised of the Sn—Bi—Ag alloy added to with Ge and the solder sample comprised of the Sn—Bi—Ag alloy added to with Ge and Cu are shorter in the zero-crossing time Tb, uprising of the wetting power and larger in the wetting power F2 than the solder sample not containing Ge or Cu. In particular, the solder sample containing both Ge and Cu are larger in the wetting power F2.

FIG. 4 also shows wetting characteristics of the solder sample containing only Cu. It is noted that, although the solder sample containing only Cu is slightly steeper in the uprising of the wetting power than the solder sample not containing Cu, it is inferior to the solder sample containing Ge or the solder sample containing both Ge and Cu.

It is seen from this that addition of Ge only or both Ge and Cu to the Sn—Bi—Ag based solder sample is effective in improving wettability.

As another experiment, the state of generation of oxides termed dross was checked by a flow employing a dipping vessel (temperature, 260° C.; dipping time, one hour). It has now been seen that, with the solder sample containing Ge, the amount of the generated dross is suppressed to 40 to 50% of that of the solder sample not containing Ge, so that addition of Ge is effective to prevent dross from being produced.

Tables 3 and 4 show the charging ratios of the respective elements and the composition after alloying for the Examples 2-1 and 2-2 and the Comparative Examples 2-1 and 2-2. As for Ge, the proportion of Ge after alloying is lower than the Ge charging ratio, as in the case of the Sn—Zn—Bi based solder sample. Also, comparison of the Example 2-1 in which Ge is added by itself to the Example 2-2 in which two elements Ge and Cu are added reveals that the Example 2-2 is higher in the Ge proportion after alloying, although the two Examples are the same as to the Ge charging ratio at the time of charging. It is seen from this that Cu operates for assisting in taking Ge into the alloy even with the Sn—Bi—Ag based alloy.

Investigations into Composition of Sn—Bi—Ag Alloy Containing Ge and Cu

Then, an optimum range of the composition was checked of the Sn—Bi—Ag alloy added to with Ge and Cu, for which the optimum wettability was acquired among Sn—Bi—Ag alloys.

A tin ingot, containing a few percent of germanium, a bismuth ingot, a germanium ingot and a copper ingot were charged in various charging amounts to a crucible and melted and allowed to cool as in Example 1-1 to prepare an ingot. Several samples produced were of the basic composition of Bi: 4 wt %, Ag: 2 wt %, Ge: 0.1 wt % and Cu: 0.5 wt %, each sample being varied from the basic composition by varying one of the elements. The tin ingot containing germanium is used as the starting material for the solder in order to suppress the error in the amount of Ge taken into the solder alloy.

For these solder samples, thus prepared, the wettability was checked by the wetting balance method as described above, while the fracture impact energy was also checked.

The fracture impact energy is the potential energy E at the height level when the soldered base material is allowed to descend from various height levels is fractured [E=mgh, where m is the weight mass of the solder, g is the acceleration of the force of gravity and h is the height of descent].

Figure 5:
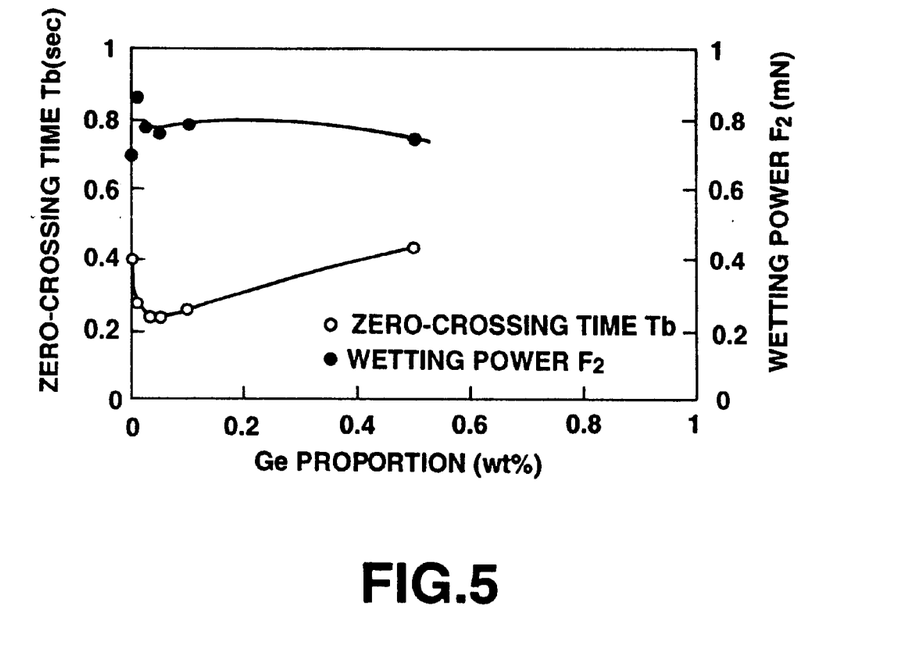
FIG. 5 is a graph showing the Ge proportion, zero-crossing time, Tb, and the wetting power F2 of a solder material comprised of a Sn—Bi—Ag alloy added to with germanium and copper.

FIG. 5 shows the relation between the Ge proportion, zero-crossing time Tb and the wetting power F2.

It is seen from FIG. 5 that wettability of the solder sample, in particular the zero-crossing time Tb, is varied depending on the Ge composition such that the zero-crossing time Tb is minimum for the Ge proportion of 0.05 wt %, with the zero-crossing time Tb being of a shorter value for the Ge proportion of 0.01 to 0.2 wt %. From this it is seen that the Ge proportion is preferably 0.01 to 0.1 wt %.

Figure 6:
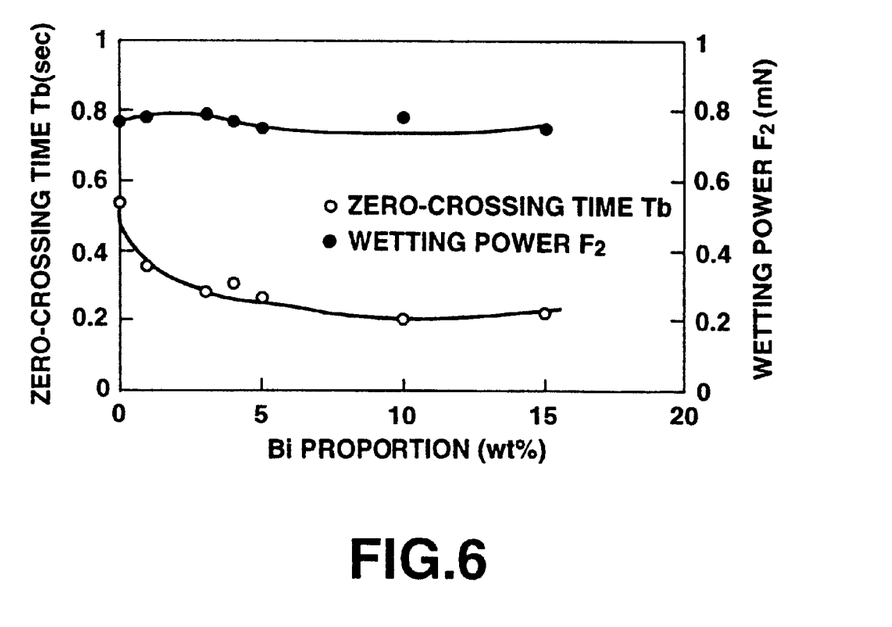
FIG. 6 is a graph showing the Bi proportion, zero-crossing time, Tb, and the wetting power F2 of a solder material comprised of a Sn—Bi—Ag alloy added to with germanium and copper.
Figure 7:
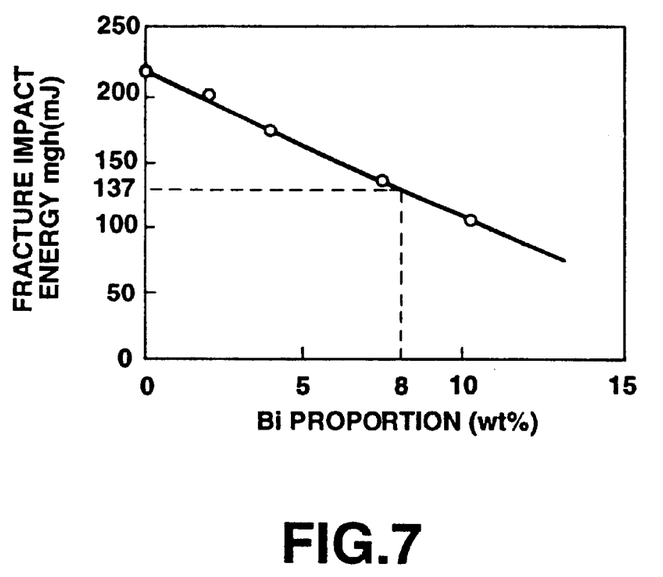
FIG. 7 is a graph showing the Bi proportion and the fracture impact energy of a solder material comprised of a Sn—Bi—Ag alloy added to with germanium and copper.

FIGS. 6 and 7 show the relation between the Bi proportion and the zero-crossing time Tb and the relation between the Bi proportion and the fracture impact energy, respectively.

As may be seen from FIG. 6, although the wetting power F2 is not varied significantly if the Bi proportion is increased, the zero-crossing time Tb is varied significantly depending on the Bi proportion, and is of a shorter value with the Bi proportion not higher than 0.5 wt %.

On the other hand, the fracture impact energy becomes shorter with an increased Bi proportion, as shown in FIG. 7. It is noted that the fracture impact energy of the tin-lead solder is 137 mJ, with the fracture impact energy higher than this being obtained for the Bi proportion not larger than 8 wt %.

That is, for realizing optimum wettability while securing mechanical strength which compares favorably with the tin-lead solder, it is necessary to set the Bi proportion to 0.5 to 8 wt %.

Figure 8:
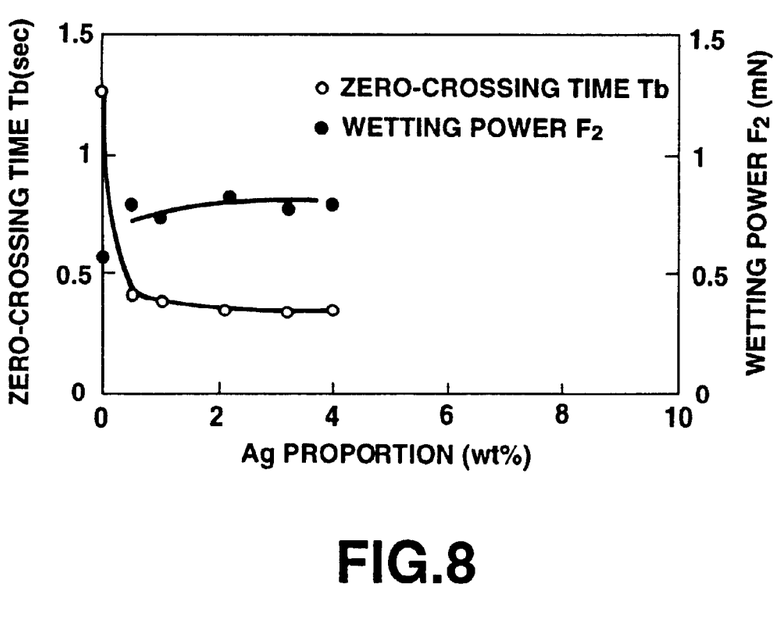
FIG. 8 is a graph showing the Ag proportion, zero-crossing time, Tb, and the wetting power F2 of a solder material comprised of a Sn—Bi—Ag alloy added to with germanium and copper.

FIG. 8 shows the relation between the Ag proportion and the wetting power F2.

Referring to FIG. B, the zero-crossing time Tb becomes acutely shorter for the Ag proportion of 0.5 wt %, while the wetting power F2 becomes acutely larger for the Ag proportion of 0.5 wt %. Thus, for realizing satisfactory wettability, the Ag proportion needs to be 0.5 wt % or higher.

Figure 9:
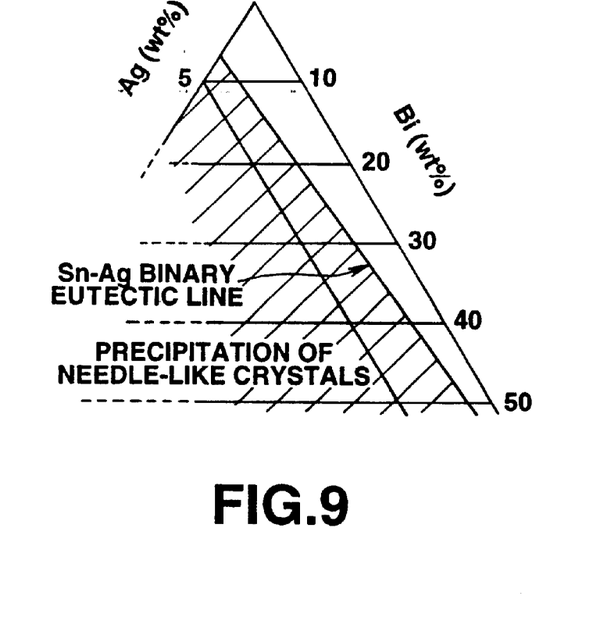
FIG. 9 is a ternary state diagram of the Sn—Bi—Ag alloy.

FIG. 9 shows a ternary state diagram of the Sn—Bi—Ag ternary system. In this figure, the left side and the right side of the triangle denote the Ag and Bi proportions, respectively. The thick line emerging in the rightward downward direction from a point corresponding to the Ag proportion of 3.5 wt % and the Bi proportion of 0 wt % is the Sn—Ag binary eutectic line. If the Ag proportion becomes larger than this line, coarse Ag$_3$Sn needle-like crystals are precipitated. As noted previously, the optimum upper limit of the Bi proportion is 8 wt %, with the Ag proportion at a point of intersection of this proportion and the Sn—Ag binary eutectic line being 3 wt %. That is, if the Bi proportion is 0.5 to 8 wt %, Ag$_3$Sn is precipitated with the Ag proportion exceeding 3 wt % such that Ag$_3$Sn further grows in size to precipitate needle-like crystals, thus impairing mechanical strength of the solder.

Therefore, in order that satisfactory wettability will be realized while precipitation of the needle-like crystals is suppressed, it is necessary to set the proportion of Ag to 0.5 to 3 wt %.

Figure 10:
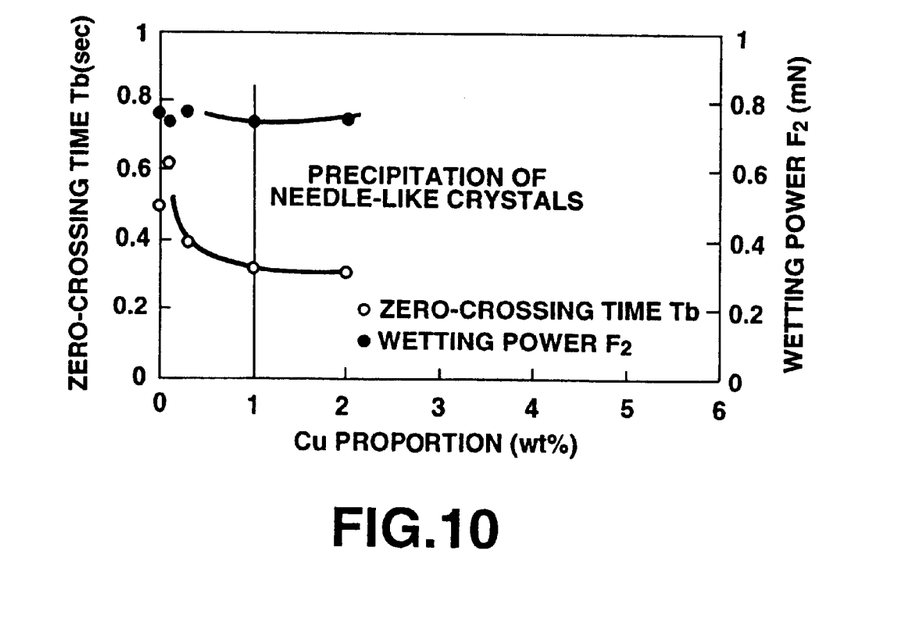
FIG. 10 is a graph showing the Cu proportion, zero-crossing time, Tb, and the wetting power F2 of a solder material comprised of a Sn—Bi—Ag alloy added to with germanium and copper.

FIG. 10 shows the relation between the Cu proportion, zero-crossing time Tb and the wetting power F2.

Referring to FIG. 10, the zero-crossing time Tb is varied significantly with the Cu proportion, such that the zero-crossing time Tb becomes significantly shorter for the Cu weight ratio of 0.3 wt %. However, if the Cu proportion is larger than 1 wt %, needle-like crystals are precipitated to impair the mechanical properties of the solder.

Therefore, the Cu proportion is desirably 0.3 to 1 wt %.

The above experimentation indicates that, with the Sn—Bi—Ag based alloy containing Ge and Cu, the optimum composition is such a composition comprised of 0.5 to 8 wt % of Bi, 0.5 to 3 wt % of Ag, 0.01 to 0.1 wt % of Ge, 0.3 to 1 wt % of Cu, with the balance being Sn.

Example 3-1

Particulate ingots of tin, zinc, indium, germanium and silver were charged into a crucible in charging amounts specified in Table 5 and melted and cooled as in Example 1-1 to prepare a solder ingot (Sn—Zn—In ingot added to with Ge and Ag). The composition of the solder sample by the ICP-AES analysis is shown in Table 6.

Comparative Example 3-1

Particulate ingots of tin, zinc and indium were charged into a crucible in charging amounts specified in Table 5 and melted and cooled as in Example 1-1 to prepare a solder ingot (Sn—Zn—In ingot containing no additives). The composition of the solder sample by the ICP-AES analysis is shown in Table 6.

Comparative Example 3-2

Particulate ingots of tin, zinc, indium and germanium were charged into a crucible in charging amounts specified in Table 5 and melted and cooled as in Example 1-1 to prepare a solder ingot (Sn—Zn—In ingot containing germanium). The composition of the solder sample by the ICP-AES analysis is shown in Table 6.

Comparative Example 3-3

Particulate ingots of tin, zinc, indium and silver were charged into a crucible in charging amounts specified in Table 5 and melted and cooled as in Example 1-1 to prepare a solder ingot (Sn—Zn—In ingot containing silver). The composition of the solder sample by the ICP-AES analysis is shown in Table 6.

Comparative Example 3-4

Particulate ingots of tin, zinc, indium and copper were charged into a crucible in charging amounts specified in Table 5 and melted and cooled as in Example 1-1 to prepare a solder ingot (Sn—Zn—In ingot containing copper). The composition of the solder sample by the ICP-AES analysis is shown in Table 6.

Comparative Example 3-5

Particulate ingots of tin, zinc, indium, germanium and copper were charged into a crucible in charging amounts specified in Table 5 and melted and cooled as in Example 1-1 to prepare a solder ingot (Sn—Zn—In ingot containing germanium and copper). The composition of the solder sample by the ICP-AES analysis is shown in Table 6.

Comparative Example 3-6

Particulate ingots of tin, zinc, indium, germanium, silver and copper were charged into a crucible in charging amounts specified in Table 5 and melted and cooled as in Example 1-1 to prepare a solder ingot (Sn—Zn—In ingot containing germanium, silver and copper). The composition of the solder sample by the ICP-AES analysis is shown in Table 6.

TABLE 5

|  | Sn (wt %) | Zn (wt %) | In (wt %) | Ag (wt %) | Ge (wt %) | Cu (wt %) |
| --- | --- | --- | --- | --- | --- | --- |
| Ex. 3-1 | 86.0 | 8.0 | 5.0 | 0.5 | 0.5 | 0.0 |
| Comp. Ex. 3-1 | 87.0 | 8.0 | 5.0 | 0.0 | 0.0 | 0.0 |
| Comp. Ex. 3-2 | 86.5 | 8.0 | 5.0 | 0.0 | 0.5 | 0.0 |
| Comp. Ex. 3-3 | 86.5 | 8.0 | 5.0 | 9.5 | 0.0 | 0.0 |
| Comp. Ex. 3-4 | 86.5 | 8.0 | 5.0 | 0.0 | 0.0 | 0.5 |

TABLE 5-continued

| | Sn (wt %) | Zn (wt %) | In (wt %) | Ag (wt %) | Ge (wt %) | Cu (wt %) |
|---|---|---|---|---|---|---|
| Comp. Ex. 3-5 | 86.0 | 8.0 | 5.0 | 0.0 | 0.5 | 0.5 |
| Comp. Ex. 3-6 | 85.5 | 8.0 | 5.0 | 0.5 | 0.5 | 0.5 |

TABLE 6

| | Sn (wt %) | Zn (wt %) | In (wt %) | Ag (wt %) | Ge (wt %) | Cu (wt %) |
|---|---|---|---|---|---|---|
| Ex. 3-1 | balance | 8.5 | 5.3 | 0.5 | 0.03 | 0 |
| Comp. Ex. 3-1 | balance | 8.1 | 5.0 | 0 | 0 | 0 |
| Comp Ex. 3-2 | balance | 8.6 | 5.1 | 0 | 0.05 | 0. |
| Comp. Ex. 3-3 | balance | 8.2 | 5.2 | 0.5 | 0 | 0 |
| Comp. Ex. 3-4 | balance | 8.2 | 5.0 | 0 | 0 | 0.4 |
| Comp. Ex. 3-5 | balance | 8.9 | 5.1 | 0 | 0.19 | 0.35 |
| Comp. Ex. 3-6 | balance | 7.8 | 5.1 | 0.5 | 0.04 | 0.44 |

Of the samples fabricated as described above, wettability was evaluated by the wetting balance method, as explained previously. The results are shown in FIGS. 11 and 12.

Figure 11:
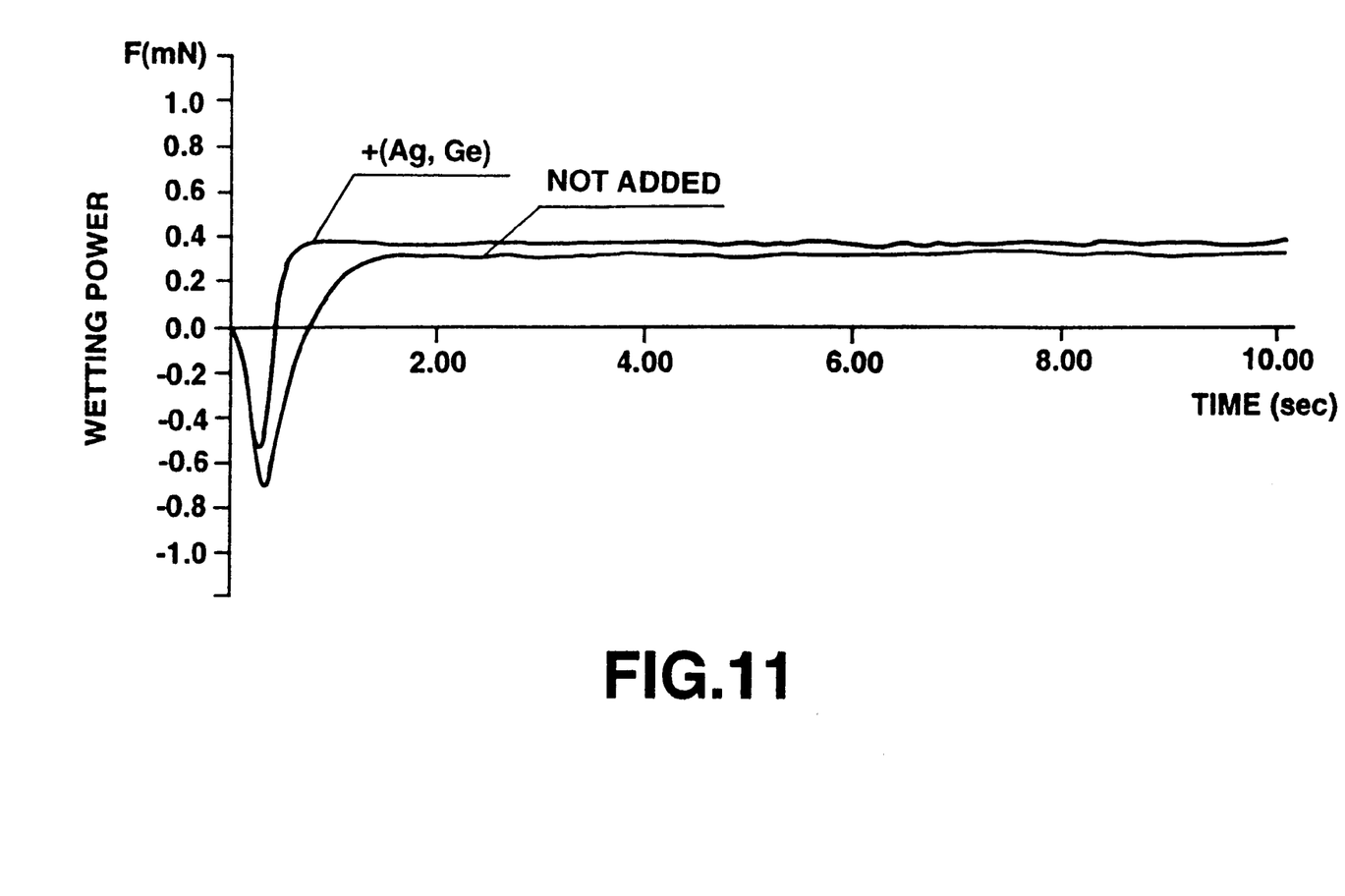
FIG. 11 is a graph showing wettability of a solder material comprised of a Sn—Zn—In alloy added to with germanium and silver and the same alloy material devoid of additives.

As seen from FIG. 11, a solder sample comprised of a Sn—Zn—In alloy added to with Ag and Ge is shorter in zero-crossing time Tb, steeper in uprising of the wetting power and larger in the magnitude of the wetting power F2 than the solder sample not containing Ag—Ge.

It is seen from this that addition of Ag and Ge to the solder sample containing no additive is effective in improving wettability.

Figure 12:
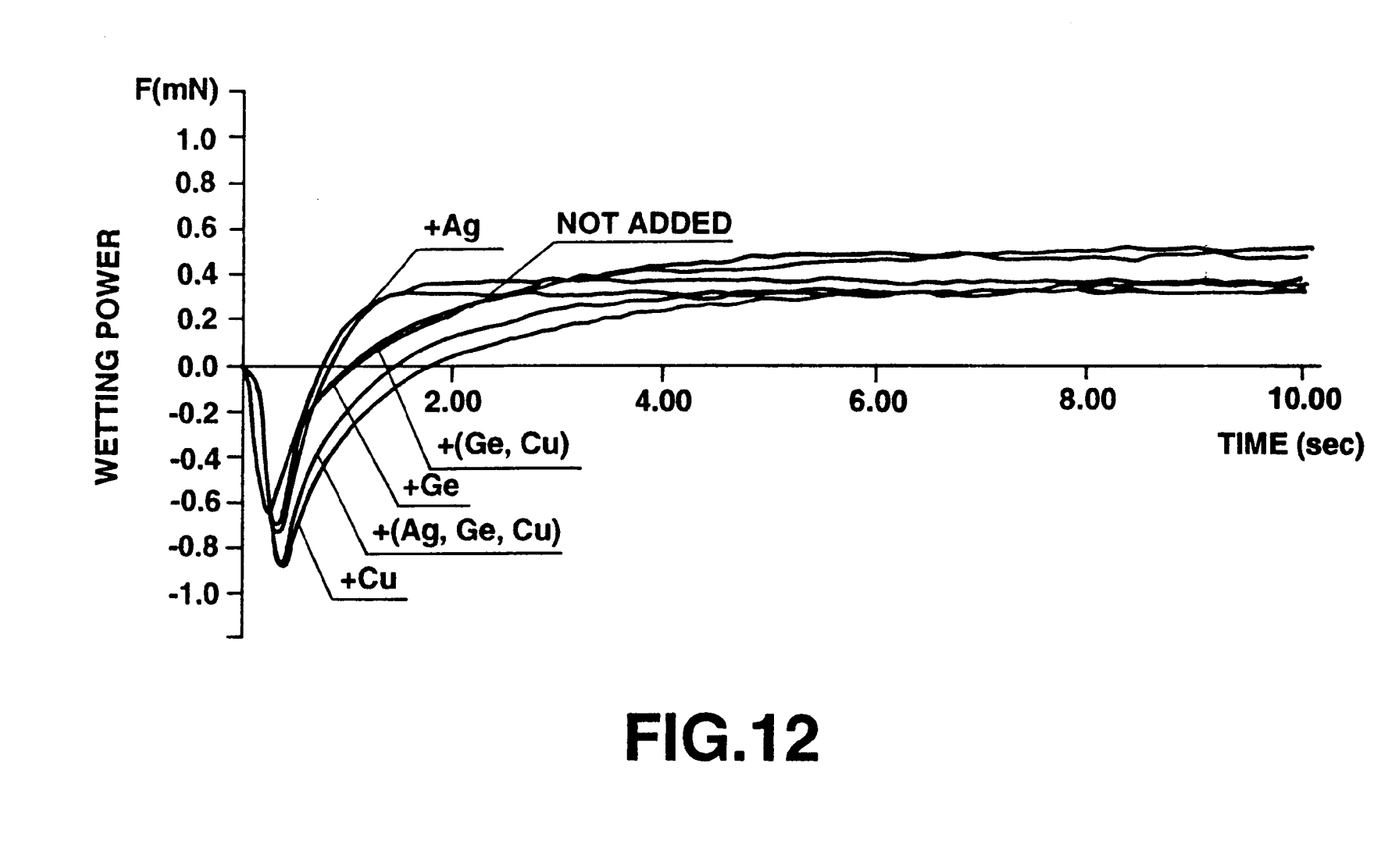
FIG. 12 is a graph showing wettability of a solder material comprised of a Sn—Zn—In alloy added to with germanium alone, a solder material comprised of a Sn—Zn—In alloy added to with silver alone, a solder material comprised of a Sn—Zn—In alloy added to with copper alone, a solder material comprised of a Sn—Zn—In alloy added to with germanium and copper, a solder material comprised of a Sn—Zn—In alloy added to with germanium, silver and copper and a solder material comprised of a Sn—Zn—In alloy devoid of additives.

FIG. 12 shows wetting characteristics of a Sn—Zn—In based solder sample containing only Ge, a Sn—Zn—In based solder sample containing only Ag, a Sn—Zn—In based solder sample containing only Cu, a Sn—Zn—In, based solder sample containing Ge and Cu and a Sn—Zn—In based solder sample containing Ag, Ge and Cu, in addition to the solder sample containing no additive.

Of these, the solder sample containing only Ag has characteristics not differing from those of the solder sample containing no additive. The solder sample containing only Ge and the solder sample containing Ge and Cu are longer in zero-crossing time and more moderate in the uprising of the wetting power and smaller in the magnitude of the wetting power F2 than the solder sample containing no additive. On the other hand, the solder sample containing only Cu and the solder sample containing Cu in addition to Ge and Ag are longer in zero-crossing time, more moderate in the uprising of the wetting power and smaller in the magnitude of the wetting power F2.

Thus it is seen that wettability of the Sn—Zn—In based solder sample is impaired with addition of Ge or Ag or addition of other elements such that the wettability improving effect is proper to addition of two elements of Ag and Ge.

As is apparent from the foregoing specification, the present invention is susceptible to being embodied with various alterations and modifications which may differ particularly from those that have been described in the preceding specification and description. It should be understood that it is desired to embody within the scope of the patent warranted herein all such modifications as reasonably and properly come within the scope of the presently defined contribution to the art.

What is claimed is:

1. A lead-free and antimony free solder alloy consisting essentially of:

from 0.5 to 10% by weight of Zn;

from 0.5 to 8% by weight of Bi;

from 0.005 to 0.05% by weight of Ge;

from 0.3 to 3% by weight of Cu; and a balance to make 100% by weight of Sn, constituting about 78% to about 98.695% Sn, and wherein the solder alloy is Ag free.

2. A lead-free solder alloy consisting essentially of:

from 0.5 to 8% by weight of Bi;

from 0.5 to 3% by weight of Ag;

from 0.01 to 0.1% by weight of Ge;

from 0.3 to 1% by weight of Cu; and a balance to make 100% by weight of Sn, constituting about 78.9% to about 99.09% Sn.

* * * * *

UNITED STATES PATENT AND TRADEMARK OFFICE
CERTIFICATE OF CORRECTION

PATENT NO. : 6,649,127 B2
DATED : November 10, 2003
INVENTOR(S) : Habu et al.

It is certified that error appears in the above-identified patent and that said Letters Patent is hereby corrected as shown below:

Title page,
Item [73], Assignee, should read -- Sony Chemicals Corporation, Tokyo, Japan. --

Signed and Sealed this

Twelfth Day of October, 2004

JON W. DUDAS
*Director of the United States Patent and Trademark Office*

UNITED STATES PATENT AND TRADEMARK OFFICE
CERTIFICATE OF CORRECTION

PATENT NO. : 6,649,127 B2
DATED : November 18, 2003
INVENTOR(S) : Habu et al.

It is certified that error appears in the above-identified patent and that said Letters Patent is hereby corrected as shown below:

Title page,
Item [73], Assignee, should read -- Sony Chemicals Corporation, Tokyo, Japan. --

This certificate supersedes Certificate of Correction issued October 12, 2004.

Signed and Sealed this

Twenty-eighth Day of December, 2004

JON W. DUDAS
*Director of the United States Patent and Trademark Office*